United States Patent

Yoshida

[11] Patent Number: 6,124,762
[45] Date of Patent: Sep. 26, 2000

[54] OVER-SAMPLING TYPE CLOCK RECOVERY CIRCUIT WITH POWER CONSUMPTION REDUCED

[75] Inventor: Ichiro Yoshida, Tokyo, Japan

[73] Assignee: NEC Corporation, Tokyo, Japan

[*] Notice: This patent is subject to a terminal disclaimer.

[21] Appl. No.: 09/266,886

[22] Filed: Mar. 12, 1999

[30] Foreign Application Priority Data

Mar. 12, 1998 [JP] Japan .................................. 10-061737

[51] Int. Cl.[7] ........................................................ H03L 7/00
[52] U.S. Cl. ........................ 331/11; 331/DIG. 2; 327/149; 375/376
[58] Field of Search ................................ 331/10, 11, 1 A, 331/DIG. 2; 375/374, 376; 327/148, 144, 149, 141

[56] References Cited

FOREIGN PATENT DOCUMENTS 3-92033 4/1991 Japan .
8-317007 11/1996 Japan .

OTHER PUBLICATIONS

Lee, et al., "A 622Mb/s CMOS Clock Recovery PLL with Time–Interleaved Phase Detector Array", in IEEE International Solid–State Circuit Conference Digest of Technical Papers, PP. 198–199, 1996.

Primary Examiner—Robert Pascal
Assistant Examiner—Kimberly E. Glenn
Attorney, Agent, or Firm—McGinn & Gibb, P.C.

[57] ABSTRACT

An over-sampling type clock recovery circuit includes a phase difference detecting section (TIPD, CP, LFP), a phase adjusting section (VCO, VD, FD) and a signal selecting section (LDEC, SW). The phase difference detecting section (TIPD, CP, LFP) detects a phase difference between a data signal and each of a plurality of active sets of clock signals, and generates a phase adjustment signal from a plurality of phase difference data corresponding to the detected phase differences. The phase adjusting section (VCO, VD, FD) generates N (N is an integer equal to or larger than 2) sets of clock signals and adjusts phases of clock signals of the N sets based on the phase adjustment signal. The signal selecting section (LDEC, SW) selects a part or all of the N sets of clock signals based on the detected phase differences from the phase difference detecting section. The selected sets of clock signals are supplied to the phase difference detecting section as the plurality of active sets of clock signals.

17 Claims, 6 Drawing Sheets

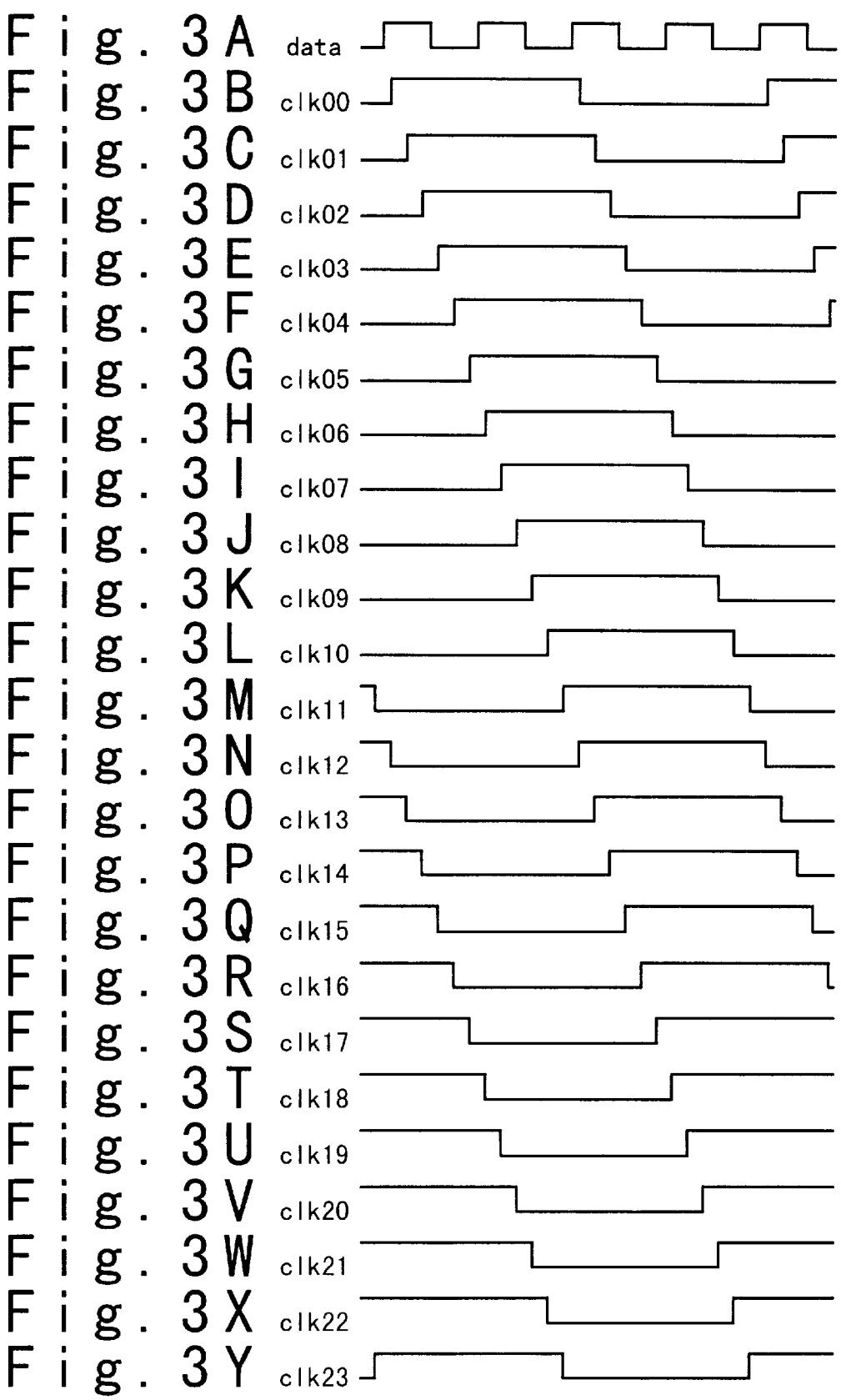

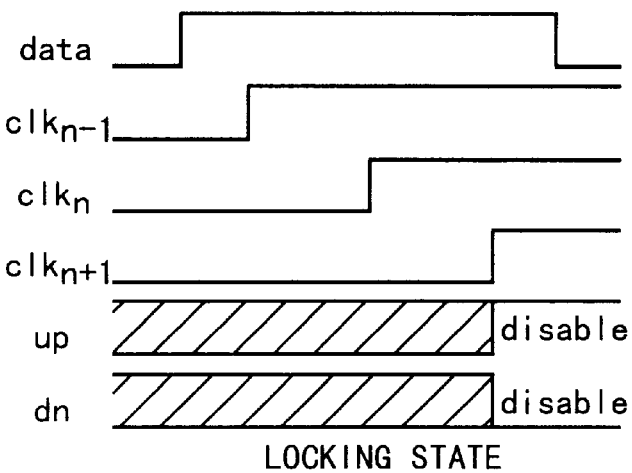
Fig. 4A data
Fig. 4B clk_{n-1}
Fig. 4C clk_n
Fig. 4D clk_{n+1}
Fig. 4E up — disable
Fig. 4F dn — disable
LOCKING STATE
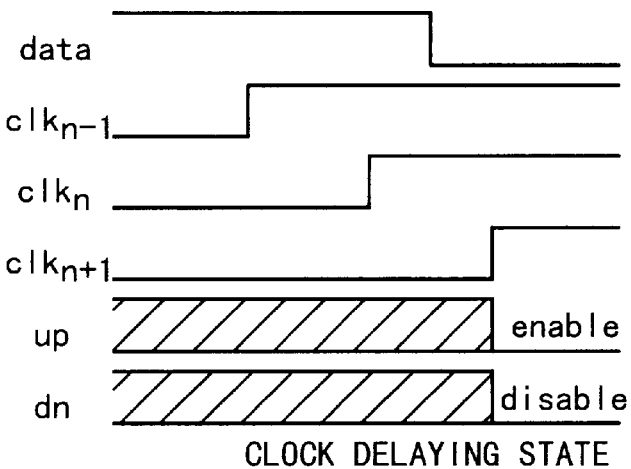
Fig. 5A data
Fig. 5B clk_{n-1}
Fig. 5C clk_n
Fig. 5D clk_{n+1}
Fig. 5E up — enable
Fig. 5F dn — disable
CLOCK DELAYING STATE
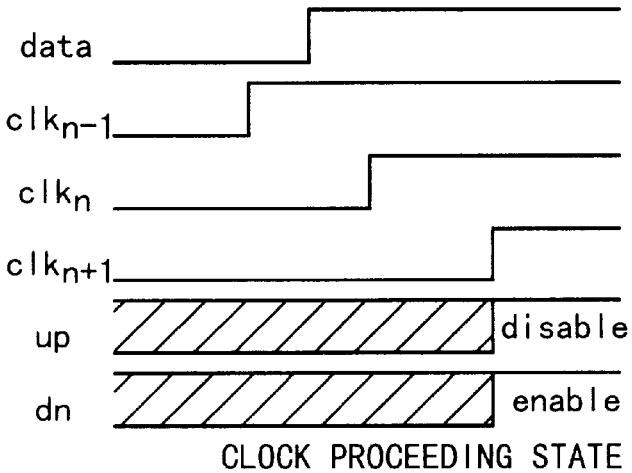
Fig. 6A data
Fig. 6B clk_{n-1}
Fig. 6C clk_n
Fig. 6D clk_{n+1}
Fig. 6E up — disable
Fig. 6F dn — enable
CLOCK PROCEEDING STATE

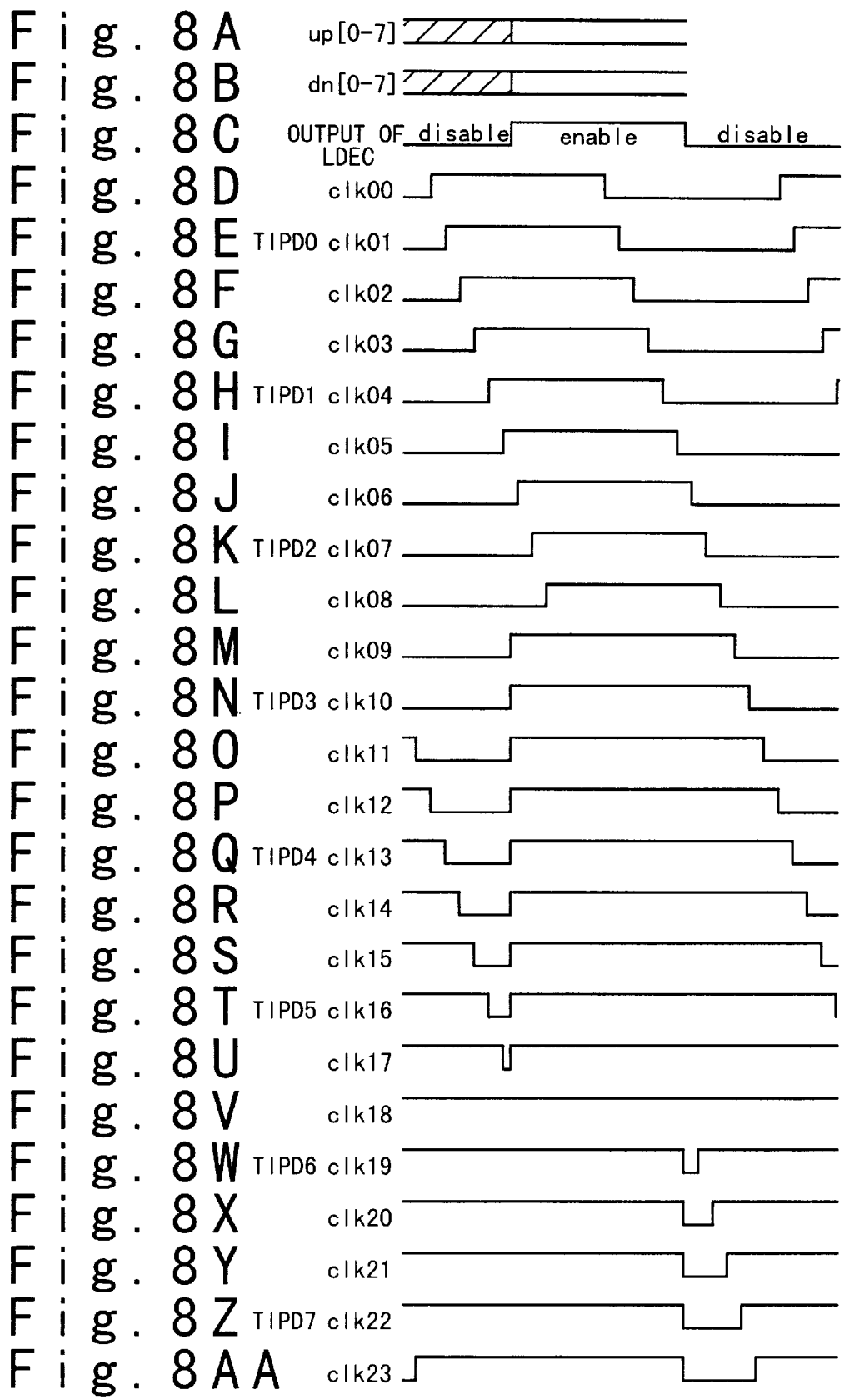

OVER-SAMPLING TYPE CLOCK RECOVERY CIRCUIT WITH POWER CONSUMPTION REDUCED

BACKGROUND OF THE INVENTION

1. Field of the Invention

The present invention relates to a clock recovery circuit, and more particularly, to an over-sampling type clock recovery circuit which performs sampling of a data signal based on a plurality of clock signals having different phases.

2. Description of the Related Art

In recent years, a high-speed protocol has been proposed such as Gbit Ethernet and Fiber Channel for data transmission. For this purpose, high speed processing is requested in a clock recovery circuit to extract a clock signal from a data signal in a high speed transmission and in a PLL circuit to establish frequency synchronization between the clock signal used in the circuit and the transmitted clock signal. In order to respond to such a request, as disclosed in 1996 IEEE International Solid-State Circuits Conference, an over-sampling type clock recovery circuit has been proposed in which the transmitted data signal is sampled based on a plurality of clock signals with different phases generated by an internal circuit.

FIG. 1 shows a circuit block diagram of a clock recovery circuit which is disclosed in the conventional example. A data signal is supplied to eight phase comparators TIPD0 to TIPD7. The respective phase comparators TIPD0 to TIPD7 are supplied with 24 clock signals having fixed delays outputted from a fixed delay circuit for every set of three clock signals. Each phase comparator detects the phase state between the data signal and the set of three clock signals. When the set of clock signals leads the data signal; the phase comparator detects the leading of the clock signals to set a corresponding one of dn signals dn0 to dn7 to an enable state and a corresponding one of up signals up0 to up7 to a disable state. Similarly, when detecting the delay of the clock signal than the data signal, the phase comparator sets the dn signal to the disable state and the up signal to the enable state.

Charge pumps CP0 to CP7 increase the output voltages when the up signals are set to the enable state and decrease the output voltages decrease when the dn signal is set to the enable state. The output voltages are supplied to a low pass filter LPF. The low pass filter LPF integrates the changes of these voltages and outputs the integrated voltage to a variable delay circuit VD. A voltage controlled oscillator VCO oscillates and generates a basic clock signal to output to the variable delay circuit VD. The variable delay circuit VD delays the basic clock signal from the voltage controlled oscillator VCO in accordance with the integrated voltage from the low pass filter LPF. Then, a fixed delay circuit FD receives the delayed clock signal from the variable delay circuit FD and generates the 24 clock signals having fixed delays from the delayed clock signal.

In the clock recovery circuit, the up signal or dn signal is set to the enable state in each phase comparator. As a result, the voltage outputted from the corresponding charge pump CP increases or decreases, when the leading or delaying states of the set of clock signals is detected. Therefore, the delayed clock signal is outputted from the variable delay circuit VD based on the phase leading or delaying state, and the 24 clock signals are generated by the fixed delay circuit FD based on the delayed clock signal. As a result, the leading or delaying state of the clock signals to be supplied to each of the phase comparators TIPD0 to TIPD7 is controlled so that the appropriate sampling of the data signal can be realized.

In such a clock recovery circuit, the number of bits of the transmitted data signal continuously having the same value is limited. Therefore, in a locking state in which any phase difference is not detected, even if the number of clock signals used for the sampling is decreased, the phase difference can be correctly detected.

However, in the above-mentioned clock recovery circuit, the eight phase comparators TIPD0 to TIPD7 are always in the operating state regardless of whether or not they are in the locking state. As the result, in the locking state, phase comparators other than those necessary to detect phase differences perform unnecessary operations. Therefore, the eight phase comparators with the relatively large power consumption operate continuously at the same time. Thus, the power consumption as the whole clock recovery circuit cannot be ignored. Also, each of the charge pumps CP0 to CP7 subsequent to the phase comparators TIPD0 to TIPD7 operate based on phase difference data outputted from the respective phase comparators. Moreover, the power consumption in the low pass filter LPF and the subsequent circuits cannot be ignored.

In addition to the above conventional example, a transmission path signal receiving system is disclosed in Japanese Laid Open Patent Application (JP-A-Heisei 3-92033). In this reference, the transmission path signal receiving system includes a signal converting section, a reference clock generating section, a determining section, and clock reproducing section. The signal converting section converts the transmission path signal into a logic signal. The reference clock generating section generates a reference clock signal having a frequency higher than a bit rate of a digital data of the transmission path signal. The determining section performs over-sampling and a logic process to the logic signal using the reference clock signal and determines a value of the digital data. The clock reproducing section inserts a predetermined pulse into the logic signal in accordance with the determining result of the determining section to reproduce a clock signal.

Also, a data receiving apparatus is disclosed in Japanese Laid Open Patent Application (JP-A-Heisei 8-317007). In this reference, the data receiving apparatus includes an A/D converting section 24, an adding section 25, a detecting section 26, a demodulating section 27, a detecting section 28, variable frequency dividing section 30, a control section 29, frame, sync signals generating sections 31 and 32. The A/D converting section 24 performs over-sampling of a reception signal based on a free-running clock signal having a frequency of integer times of a symbol rate to convert the sampling values into digital values. The adding section 25 adding the digital sampling values synchronously for a symbol period over a predetermined period. The detecting section 26 detects a symbol identifying point from the synchronously adding result. The demodulating section 27 performs data demodulation based on the sample value at the symbol identifying point. The detecting section 28 detects the displacement of the symbol identifying point accompanied with time as a phase shift. The variable frequency dividing section 30 divides the free-running clock signal in frequency to reproduce a bit clock signal. The control section 29 controls a frequency division ratio of the variable frequency dividing section 30 to correct a phase shift. The frame sync signals generating sections 31 and 32 extract a known sync word from the demodulated data to establish a frame synchronization and generate a frame sync timing signal based on the extracted sync word.

SUMMARY OF THE INVENTION

An object of the present invention is to provide an over-sampling type clock recovery circuit in which unnecessary operation is avoided in a locking state.

Another object of the present invention is to provide an over-sampling type clock recovery circuit in which power consumption can be reduced.

In order to achieve a first aspect of the present invention, an over-sampling type clock recovery circuit includes a phase difference detecting section, a phase adjusting section, and a signal selecting section. The phase difference detecting section detects a phase difference between a data signal and each of a plurality of active sets of clock signals, and generates a phase adjustment signal from a plurality of phase difference data corresponding to the, detected phase differences. The phase adjusting section generates N (N is an integer equal to or larger than 2) sets of clock signals and adjusts phases of clock signals of the N sets based on the phase adjustment signal. The signal selecting section selects a part or all of the N sets of clock signals based on the detected phase differences from the phase difference detecting section and supplies the selected sets of clock signals to the phase difference detecting section as the plurality of active sets of clock signals.

The phase adjusting section may include an oscillator for generating a reference clock signal, a delay unit for delaying the reference clock signal based on the phase adjustment signal, and a clock signal generating section for generating the N sets of clock signals from the delayed reference, signal such that each of the plurality of clock signals has a predetermined delay.

The phase difference detecting section may include N phase comparators. The plurality of active sets of clock signals are supplied to selected ones of the N phase comparators, and each of the selected phase comparators compares a corresponding one of bits of the data signal and a corresponding one of the plurality of active sets of clock signals in phase to detect the phase difference and for generating the phase difference data based on the detected phase difference. The phase difference detecting section may further include an adjustment signal generating section for generating the phase adjustment signal from the plurality of phase difference data from the selected phase comparators. In this case, non-selected phase comparators of the N phase comparators stop their operations to reduce power consumption. A portion of the adjustment signal generating section corresponding to the non-selected phase comparators also stops its operation to reduce power consumption.

The part of the N sets of clock signals is preferably predetermined.

It is preferable that the signal selecting section selects all of the N sets of clock signals when any one of the plurality of phase difference data indicates that the data signal and a corresponding one of the plurality of active sets of clock signals are not matched to each other in phase, and the part of the N sets of clock signals when all of the phase differences indicate that the data signal and a corresponding one of the plurality of active sets of clock signals are matched to each other in phase.

The signal selecting section may include a locking state detecting circuit and a switch circuit. The locking state detecting circuit determines, based on the plurality of phase difference data supplied from the phase difference detecting section, whether the data signal and each of the plurality of active sets of clock signals are matched to each other in phase. The switch circuit supplies all of the N sets of clock signals to the phase difference detecting section as the plurality of active sets of clock signals when the locking state detecting circuit detects that the data signal and at least one of the plurality of active sets of clock signals are not matched to each other in phase. In this case, the switch circuit fixes the clock signals of non-selected sets as ones of the N sets other than the selected sets to a high or low level, when the locking state-detecting circuit detects that the data signal and each of the plurality of active sets of clock signals are matched to each other in phase, and supplies the selected sets of clock signals and the non-selected sets of clock signals to the phase difference detecting section.

In order to achieve another aspect of the present invention, a method of adjusting phases of clock signals in an over-sampling type clock recovery circuit comprising:

detecting a phase difference between a data signal and each of a plurality of active sets of clock signals, to generate a phase adjustment signal from a plurality of phase difference data corresponding to the detected phase differences;

adjusting phases of clock signals of N (N is an integer equal to or larger than 2) sets based on the phase adjustment signal; and selecting a part or all of the N sets of clock signals as the plurality of active sets of clock signals based on the plurality of phase difference data from the phase difference detecting section.

BRIEF DESCRIPTION OF THE DRAWINGS

FIGS. 3A to 3Y are timing charts illustrating a data signal and clock signals;

FIGS. 4A to 4F are timing charts to explain an operation of a phase comparator in a locking state;

FIGS. 5A to 5F are timing charts to explain an operation of a phase comparator in a clock delaying state;

FIGS. 6A to 6F are timing charts to explain an operation of a phase comparator in a clock leading state;

FIGS. 8A to 8AA are timing charts to explain an operation of a switch circuit in response to the output of a locking state detecting circuit.

DESCRIPTION OF THE PREFERRED EMBODIMENTS

Next, an over-sampling type clock recovery circuit of the present invention will be described below in detail with reference to the attached drawings.

Figure 1:
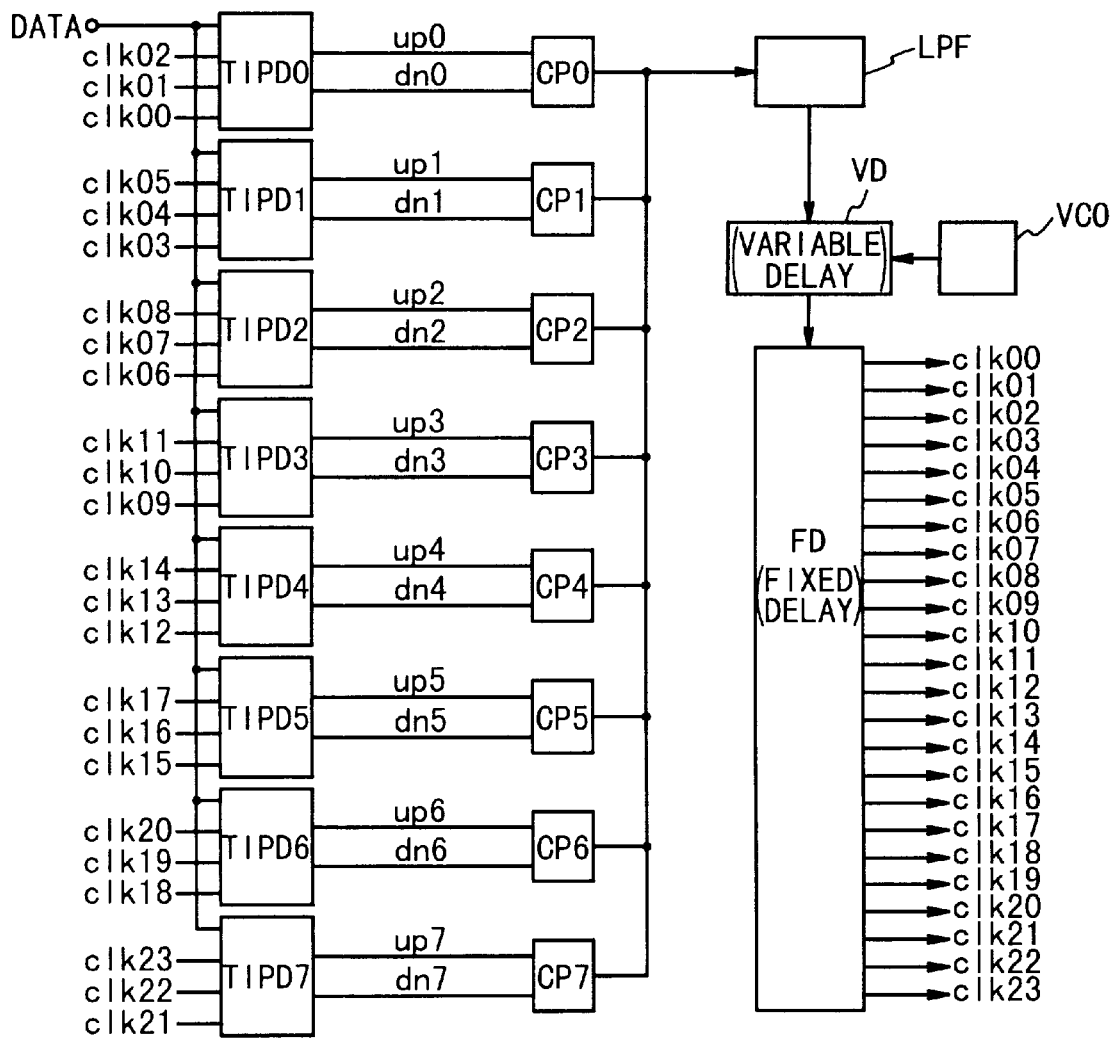
FIG. 1 is a block diagram illustrating the structure of an example of a conventional clock recovery circuit.
Figure 2:
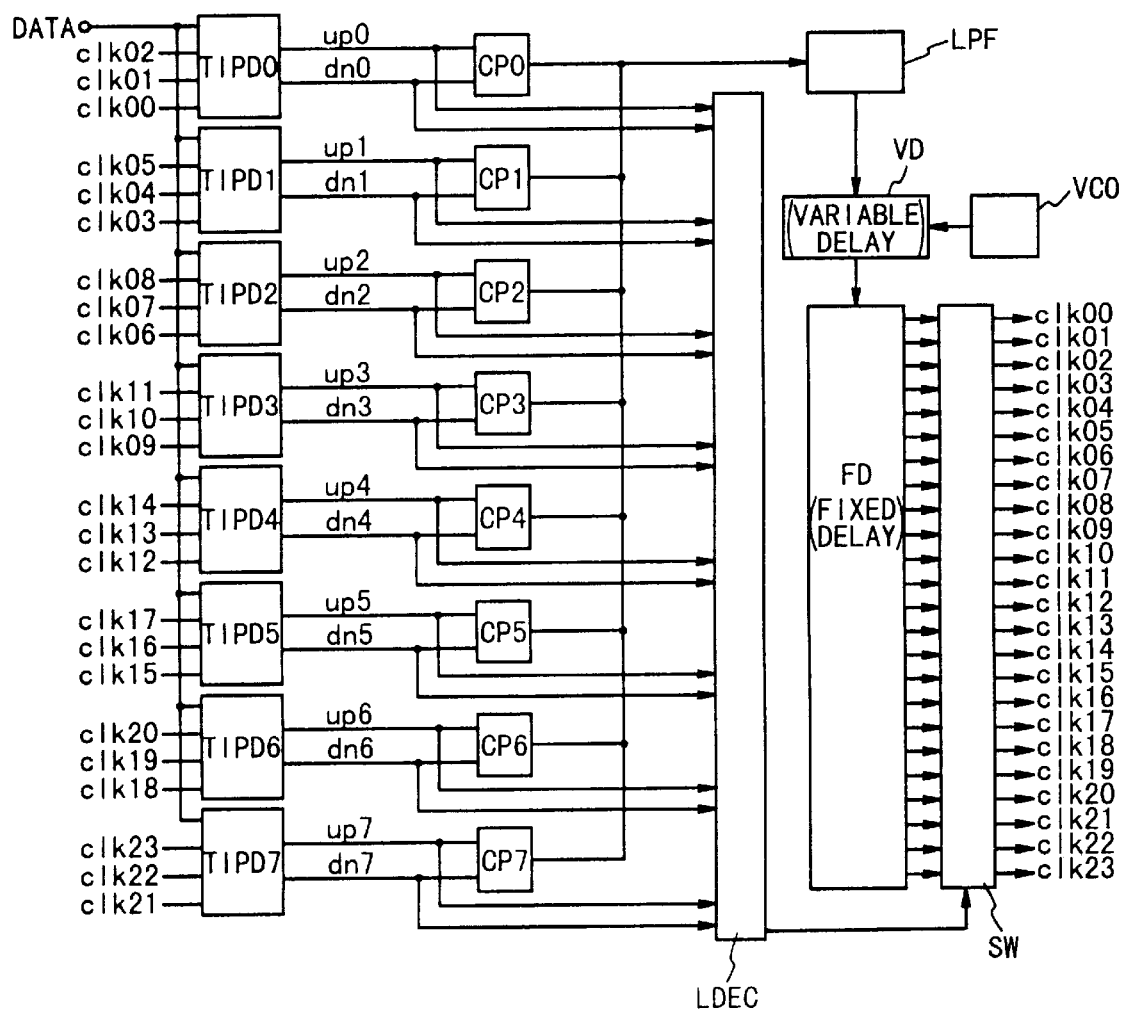
FIG. 2 is a circuit block diagram illustrating the structure of an over-sampling type clock recovery circuit according to an embodiment of the present invention.

FIG. 2 is a block circuit diagram illustrating the structure of an over-sampling type clock recovery circuit according to an embodiment of the present invention. It should be noted that the same reference numerals are allocated to the same components as those of the conventional clock recovery circuit. The over-sampling type clock recovery circuit in the embodiment is composed of eight phase comparators TIPD0 to TIPD7, charge pumps CP0 to CP7, a low pass filter LPF, a variable delay circuit VD, a voltage controlled oscillator VCO, a fixed delay circuit FD, a locking state detecting circuit LDEC, and a switch circuit SW. The phase comparators TIPD0 to TIPD7 are provided to perform sampling of, a data signal of 8 bits with three clock signals. That is, each of the comparators TIPD0 to TIPD7 inputs the clock signals having the same fixed delay and the transmitted data signal and detects the phase state between the data signal and clock signals to output a phase difference data corresponding to the detected phase state.

FIGS. 4A to 4F show a locking state in which the phases of the data signal and the clock signals are coincident with each other in phase. FIGS. 5A to 5F show the clock delaying state in which the data signal leads the clock signals. When the data signal leads than the clock signals, the phase comparator detects the clock leading state to set an up signal of the phase difference data to an enable state and to set a dn signal of the phase difference data to a disable state. FIGS. 6A to 6F show the clock leading state in which the data signal delays than the clock signals. When the data signal delays than the clock signals, the phase comparator detects the clock leading state to set the up signal to a disable state and to set the dn signal to an enable state.

The respective charge pumps CP and the single locking state detecting circuit LDEC are connected to the output terminals of said phase comparators TIPD for the up signals and the dn signals in parallel. The locking state detecting circuit LDEC recognizes the locking state of each phase comparator from the phase states of the up signal and dn signal outputted from each phase comparator, and detects whether all the phase comparators, i.e. the whole circuit is set to the locking state. Then, the locking state detecting circuit LDEC outputs a locking state detection signal switched between the enable state and the disable state based on the detection result of the locking state.

The charge pumps CP0 to CP7 input the up signals and the dn signals from the phase comparators TIPD0 to TIPD7 and changes the output voltage in accordance with the up signals and the dn signals to output to the low pass filter LPF. The low pass filter LPF integrates the changes of the output voltages from the charge pumps CP0 to CP7 to output to the variable delay circuit VD. The variable delay circuit VD inputs a reference clock signal having a predetermined frequency supplied from the voltage controlled oscillator VCO and the output of the low pass filter LPF, and delays the reference clock signal in accordance with the output voltage of the low pass filter LPF. Moreover, the fixed delay circuit FD inputs the output of the variable delay circuit VD, and generates 24 clock signals clk00 to 23 having fixed delays from the delayed reference clock signal to supply to the phase comparators TIPD0 to TIPD7 for every three clock signals.

Moreover, the switch circuit SW is connected to the output terminals of the fixed delay circuit FD for the 24 clock signals such that the level of each clock signal is selectively set to a high level or a low level, to the high level in this example.

When a locking state detection signal supplied from the locking state detecting circuit LDEC indicates the locking states of the phase comparators, the switch circuit SW fixes predetermined ones of the 24 clock signals clk00 to clk23 as selected clock signals to the high level. In this case, the clock signals fixed to the high level are predetermined for every set of three clock signals to be supplied to the phase comparator. Therefore, only the clock signals supplied to the selected ones of the phase comparators TIPD0 to TIPD7 are fixed to the high level. Non-selected clock signals of the 24 clock signals other than the selected clock signals are supplied, as they are, to non-selected ones of the phase comparators TIPD0 to TIPD7 other than the selected phase comparators through the switch circuit SW.

When a locking state detection signal supplied from the locking state detecting circuit LDEC indicates the clock leading or delaying states of the phase comparators, the switch circuit SW supplies the 24 clock signals clk00 to clk23 to the phase comparators TIPD0 to TIPD7, as they are.

Next, the operation of the clock recovery circuit having the above-mentioned structure will be described. FIGS. 3A to 3Y are time charts to explain the data signal supplied to the eight phase comparators and the 24 clock signals used to perform sampling of the supplied data signal.

Since there is no need to change the phase of the clock signals in the locking state, both of the up signal and dn signal of the phase difference data are set to the disable state. When the clock signals delay than the data signal, the up signal is set to the enable state and the dn signal is set to the disable state, so that the phases of the clock signals are led. On contrary, when the clock signals lead the data signal, the up signal is set to the disable state and the dn signal is set to the enable state, so that the phases of the clock signals are delayed.

The up signals and dn signals are supplied from the respective phase comparators TIPD0 to TIPD7 to the respective charge pumps CP0 to CP7 and the single locking state detecting circuit LDEC, respectively. In each charge pump CP to which the up signal and the dn signal are supplied, the phase difference data obtained from these up signals and the dn signals are converted into the voltage value. That is, the output voltage is increased when the up signal is set to the enable state, and the output voltage is decreased when the dn signal is set to the enable state.

Figure 7:
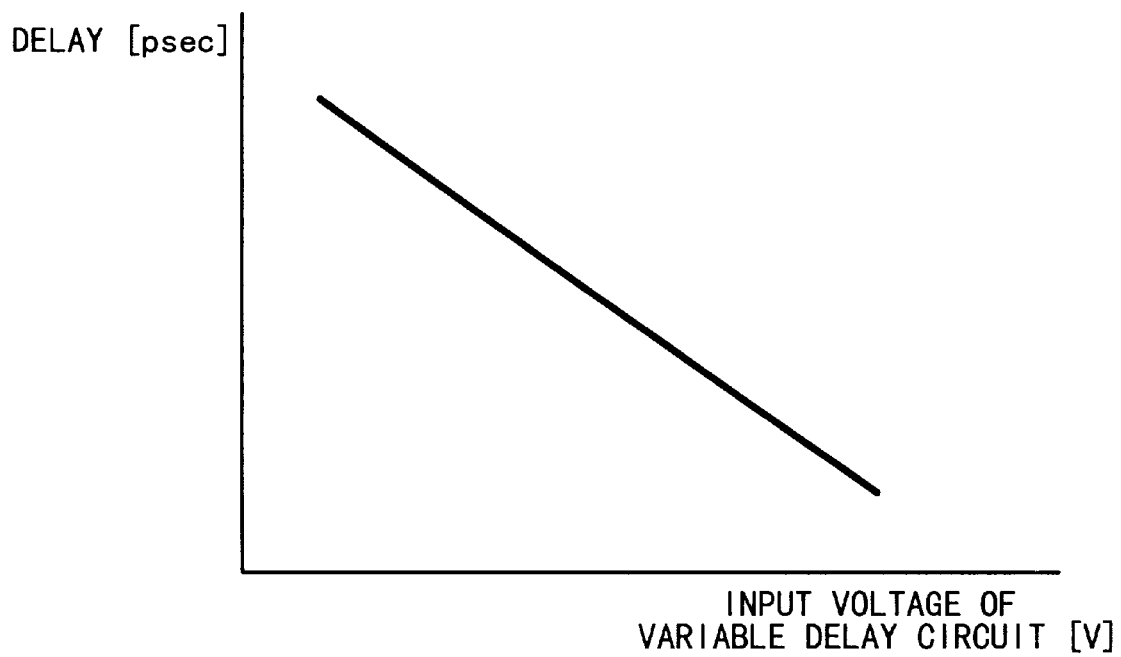
FIG. 7 is a diagram illustrating the input-output characteristic of a variable delay circuit.

Then, the low pass filter LPF inputs the output voltages from the charge pumps CP0 to CP7 and integrates the changes of the voltages. The variable delay circuit VD inputs the output voltage of low pass filter LPF and the reference clock signal which is the output of the voltage controlled oscillator VCO, and delays and outputs the reference clock signal in accordance with the output voltage of the low pass filter LPF. The relation of a delay quantity to the input voltage from the variable delay circuit VD is shown in FIG. 7.

The delayed reference clock signal is supplied from the variable delay circuit VD to the fixed delay circuit FD. The fixed delay circuit FD generates the 24 clock signals clk00 to clk23 which have the same phase differences between them from the delayed reference clock signal to output to the phase comparators TIPD.

On the other hand, the locking state detecting circuit LDEC inputs the up signals and the dn signals from the phase comparators TIPD. The locking state detecting circuit LDEC recognizes the detection results of the respective phase comparators TIPD0 to TIPD7 based on the up signals and the dn signals, that is, the respective phase states from the phase difference data. Then, when all the up signals and all the dn signals are set to the disable, in other words, the locking states are detected, the locking state detecting circuit LDEC outputs a locking state indication signal set to an enable state to the switch circuit SW. It should be noted that when at least one of the up signals and dn signals outputted from the phase comparators TIPD is set to the enable state, i.e., in a non-locking state, the locking state detecting circuit LDEC outputs a locking state indication signal set to a disable state.

FIGS. 8A to 8AA show timing charts to explain the operation of the switch circuit SW based on the enable state and the disable state of the locking state indication signal from the locking state detecting circuit LDEC. When the non-locking state is detected by the locking state detecting circuit LDEC, the switch circuit SW supplies all of the 24 clocks supplied from the fixed delay circuit FD to the respective phase comparators TIPD in response to the locking state indication signal of the disable state.

On the other hand, when the locking state detecting circuit LDEC detects the locking states of all the phase comparators, the switch circuit SW sends only the selected ones of the 24 clock signals to selected ones of the phase comparators TIPD, just as they are, in response to the enable output. The switch circuit SW fixes the non-selected clock signals to the high state. In the example shown in FIGS. 8A to 8AA, the switch circuit SW supplies 9 clock signals clk00 to clk08 to the phase comparators TIPD0 to TIPD2 in case of the locking state. However, the switch circuit SW fixes the other 15 clock signals clk09 to clk23 to the high level and supplies them to the phase comparators TIPD3 to TIPD7, respectively. That is, these phase comparators TIPD3 to TIPD7 are set to the states equivalent to the state in which any clock signal is not supplied.

Generally, the number of data bits of the transmitted data signal which continuously have the same value is defined depending upon the transmission system. Therefore, even if the number of clock signals used for sampling in the locking state is reduced, the detection of the phase difference is normally performed. The phase comparators TIPD0 to TIPD2 to which the clock signals are supplied in the locking state performs the phase detection as in the non-locking state. When any clock signal is not supplied, the phase comparator does not perform the phase difference detecting operation and the phase comparator TIPD maintains the locking state regardless of the phase difference between the data signal and the clock signals. As shown in FIGS. 4A to 4F, the phase comparator needs the change point (the edge) of the clock signals supplied for the sampling of the data signal. Therefore, when the clock signals supplied to the phase comparator are fixed to the high or low level so that the phase comparator is set to the state equivalent to the state in which any clock signal is not supplied, the phase difference detecting operation of the phase comparator can be restrained. Therefore, the phase comparators TIPD3 to TIPD7 are set to the state in which the phase detecting operation is stopped so that power consumption can be reduced. It should be noted that when the clock leading or delaying state is detected in the phase detecting operation by either one or all of the phase comparators TIPD0 to TIPD3 performing the phase difference detecting operation, the switch circuit SW again supplies all the clock signals which are not fixed to the high level, to the respective phase comparators TIPD0 to TIPD7. This is because the locking state detecting circuit LDEC outputs the locking state indication signal of the disable state. This is performed until all the phase comparators TIPD0 to TIPD7 are set to the locking state again.

In this way, the locking stated of the phase comparators are detected by the locking state detecting circuit LDEC. In the non-locking state, all the clock signals generated by the fixed delay circuit FD are supplied to the phase comparators TIPD0 to TIPD7, whereas, only the selected ones of the clock signals are supplied to the selected ones of the phase comparators in the locking state. Thus, in the locking state, the operations of the selected phase comparators are set to the stopped state. Also, the charge pumps CP connected with the selected phase comparators are set to the state in which the operations are set to the stopped state. Therefore, it is possible to decrease the power consumption of the whole clock recovery circuit in the locking state. The total power consumption of the whole circuit can be reduced.

It should be noted that the embodiment shows an example of the present invention only. It is possible to suitably set the number of clock signals to be fixed to the high level in the locking state and the number of phase comparators. Also, in the locking state, the selected clock signals may be fixed to the low level. Further, it would not need to say that the number of bits of the data signal and the number of phase comparators associated with this number of bits of the data signal and the number of clock signals having the fixed phases used for phase comparison can be set suitably in accordance with the required speed.

As described above, in the present invention, the locking state of each phase comparator is detected by the locking state detecting circuit based on the phase difference data between the data signal and the clock signals outputted from the plurality of phase comparators. In the non-locking state, all clock signals are supplied to the respective phase comparators. In the locking state, the selected clock signals are fixed to the high level or the low level and the selected clock signals are supplied to only the selected phase comparators. Therefore, in the locking state, the operations of the selected phase comparators are set to the stopped state. Also, the circuit elements connected with the phase comparators are set to the state in which the operations are set to the stopped state. Therefore, it is possible to reduce the power consumption of the whole clock recovery circuit in the locking state. The total power consumption of the whole circuit can be reduced.

What is claimed is:

1. An over-sampling type clock recovery circuit comprising:

a phase difference detecting section for detecting a phase difference between a data signal and each of a plurality of active sets of clock signals, and for generating a phase adjustment signal from a plurality of phase difference data corresponding to the detected phase differences;

a phase adjusting section for generating N (N is an integer equal to or larger than 2) sets of clock signals and for adjusting phases of clock signals of said N sets based on said phase adjustment signal; and a signal selecting section for selecting a part or all of said N sets of clock signals based on the detected phase differences from said phase difference detecting section and for supplying the selected sets of clock signals to said phase difference detecting section as said plurality of active sets of clock signals.

2. An over-sampling type clock recovery circuit according to claim 1, wherein said phase adjusting section includes:

an oscillator for generating a reference clock signal;

a delay unit for delaying said reference clock signal based on said phase adjustment signal; and a clock signal generating section for generating said N sets of clock signals from said delayed reference signal such that each of said plurality of clock signals has a predetermined delay.

3. The over-sampling type clock recovery circuit according to claim 1, wherein said phase difference detecting section includes:

N phase comparators, wherein said plurality of active sets of clock signals are supplied to selected ones of said N phase comparators, and each of said selected phase comparators compares a corresponding one of bits of said data signal and a corresponding one of said plurality of active sets of clock signals in phase to detect the phase difference and for generating said phase difference data based on the detected phase difference;

an adjustment signal generating section for generating said phase adjustment signal from said plurality of phase difference data from said selected phase comparators, wherein said N phase comparators are selected by said signal selecting section.

4. The over-sampling type clock recovery circuit according to claim 3, wherein non-selected phase comparators of said N phase comparators stop their operations to reduce power consumption.

5. The over-sampling type clock recovery circuit according to claim 4, wherein a portion of said adjustment signal generating section corresponding to said non-selected phase comparators stops its operation to reduce power consumption.

6. An over-sampling type clock recovery circuit according to claim 1, wherein the part of said N sets of clock signals is predetermined.

7. An over-sampling type clock recovery circuit according to claim 1, wherein said signal selecting section selects all of said N sets of clock signals when any one of said plurality of phase difference data indicates that said data signal and a corresponding one of said plurality of active sets of clock signals are not matched to each other in phase, and the part of said N sets of clock signals when all of the phase differences indicate that said data signal and a corresponding one of said plurality of active sets of clock signals are matched to each other in phase.

8. An over-sampling type clock recovery circuit according to claim 1, wherein said signal selecting section includes:

a locking state detecting circuit for determining based on said plurality of phase difference data supplied from said phase difference detecting section whether said data signal and each of said plurality of active sets of clock signals are matched to each other in phase; and a switch circuit for supplying all of said N sets of clock signals to said phase difference detecting section as said plurality of active sets of clock signals when said locking state detecting circuit detects that said data signal and at least one of said plurality of active sets of clock signals are not matched to each other in phase.

9. An over-sampling type clock recovery circuit according to claim 8, wherein said switch circuit fixes said clock signals of as non-selected sets as ones of said N sets other than said selected sets to a high or low level, when said locking state detecting circuit detects that said data signal and each of said plurality of active sets of clock signals are not matched to each other in phase, and supplies said selected sets of clock signals and said non-selected sets of clock signals to said phase difference detecting section.

10. A method of adjusting phases of clock signals in an over-sampling type clock recovery circuit comprising the steps of:

detecting a phase difference between a data signal and each of a plurality of active sets of clock signals, to generate a phase adjustment signal from a plurality of phase difference data corresponding to the detected phase differences;

adjusting phases of clock signals of N (N is an integer equal to or larger than 2) sets based on said phase adjustment signal; and selecting a part or all of said N sets of clock signals as said plurality of active sets of clock signals based on said plurality of phase difference data from said phase difference detecting section.

11. A method according to claim 10, wherein said adjusting step includes:

generating a reference clock signal;

delaying said reference clock signal based on said phase adjustment signal;

generating said N sets of clock signals from said delayed reference signal such that each of said plurality of clock signals has a predetermined delay; and adjusting phases of clock signals of said N sets based on said phase adjustment signal.

12. A method according to claim 10, wherein said detecting step includes:

comparing a corresponding one of bits of said data signal and a corresponding one of said plurality of active sets of clock signals in phase to detect the phase difference and to generate said phase difference data based on the detected phase difference; and generating said phase adjustment signal from said plurality of phase difference data.

13. A method according to claim 12, wherein said detecting step is performed by a phase difference detecting section, and wherein said selecting step includes selecting a part or all of said N sets of clock signals such that a portion of said phase difference detecting section to which said plurality of active sets of clock signals are not supplied does not operate.

14. A method according to claim 10, wherein the part of said N sets of clock signals is predetermined.

15. A method according to claim 10, wherein said selecting step includes:

selecting all of said N sets of clock signals when any one of said plurality of phase difference data indicates that said data signal and a corresponding one of said plurality of active sets of clock signals are not matched to each other in phase; and selecting the part of said N sets of clock signals when all of said plurality of phase difference data indicate that said data signal and a corresponding one of said plurality of active sets of clock signals are matched to each other in phase.

16. A method according to claim 10, wherein said selecting step includes:

determining based on said plurality of phase difference data whether said data signal and each of said plurality of active sets of clock signals are matched to each other in phase; and selecting all of said N sets of clock signals as said plurality of active sets of clock signals when said plurality of phase difference data indicate that said data signal and at least one of said plurality of active sets of clock signals are not matched to each other in phase.

17. A method according to claim 16, wherein said selecting step includes:

fixes said clock signals of as non-selected sets as ones of said N sets other than said selected sets to a high or low level, when said locking state detecting circuit detects that said data signal and each of said plurality of active sets of clock signals are not matched to each other in phase.

* * * * *